United States Patent [19]
Korban et al.

[11] Patent Number: 4,850,248
[45] Date of Patent: Jul. 25, 1989

[54] FRICTIONLESS CONTINUOUSLY VARIABLE TRANSMISSION

[76] Inventors: Joseph F. Korban; Nouhad F. Korban, both of 220 E. Mermaid Ln. #159, Phila., Pa. 19118

[21] Appl. No.: 851,405
[22] Filed: Apr. 11, 1986
[51] Int. Cl.4 ............................................. F16H 3/44
[52] U.S. Cl. ........................................ 74/793; 74/63
[58] Field of Search ................ 74/793, 773, 804, 756, 74/757, 805, 797, 63

[56] References Cited

U.S. PATENT DOCUMENTS

| | | | |
|---|---|---|---|
| 781,944 | 2/1905 | Hall | 74/797 |
| 792,748 | 6/1905 | Arnold | 74/797 |
| 1,297,092 | 3/1919 | Carlson | 74/797 |
| 1,389,622 | 9/1921 | Buehler | 74/797 |
| 2,090,810 | 8/1937 | Russell et al. | 74/797 |
| 2,734,397 | 2/1956 | Bade | 74/796 |
| 2,747,434 | 5/1956 | Bade | 74/796 |
| 3,363,482 | 1/1968 | Case | 74/793 |
| 4,660,427 | 4/1987 | Fenton | 74/805 X |

Primary Examiner—Leslie A. Braun
Assistant Examiner—David Novais
Attorney, Agent, or Firm—Morgan & Finnegan

[57] ABSTRACT

A continuously variable transmission comprising a drive plate having a series of radial slots attached to an input shaft. A bevel gear is concentrically mounted on the end of an output shaft held parallel to the input shaft. Lockable pinions are provided which mesh with the bevel gear teeth and slidably engage the drive plate. Locking devices are provided for selectively locking or unlocking the pinions as they rotate about the bevel gear. As the input shaft and driving plate rotate the pinions lock and unlock depending upon their position in relation to the driving plate. When locked, the input shaft drives the output shaft by transmitting power through the driving plate into the locked pinions slidably held in slots in the driving plate and then into the bevel gear and output shaft.

1 Claim, 4 Drawing Sheets

FRICTIONLESS CONTINUOUSLY VARIABLE TRANSMISSION

BACKGROUND OF THE INVENTION

The invention relates to a Frictionless Continuously Variable Transmission. In this device, the transmission's number of possible gear ratios within an overall range is infinite, not limited to a specific three, four, or even five of an ordinary transmission. This device represents an extraordary simplification in the transmission's mechanism and, for the first time, an almost frictionless transmission.

BRIEF DESCRIPTION OF THE DRAWINGS

In drawings which illustrate embodiments of the invention.

DESCRIPTION OF PREFERRED EMBODIMENTS

THE OUTPUT SECTION

Figure 1:
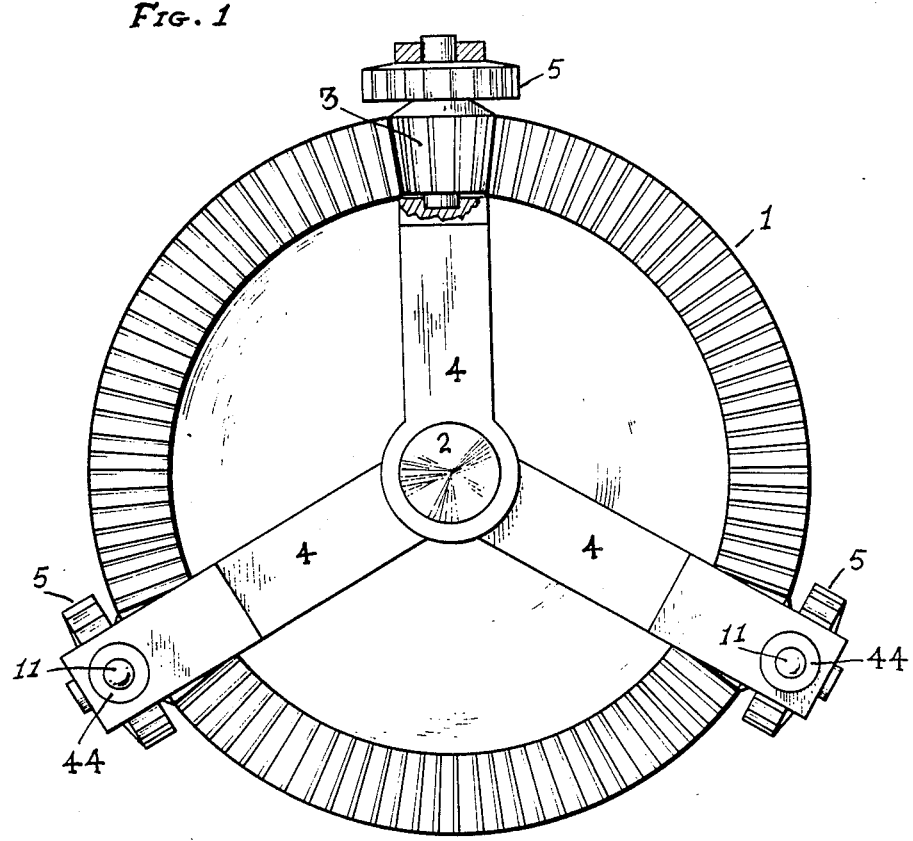
FIG. 1 is a top view of the output section.
Figure 2:
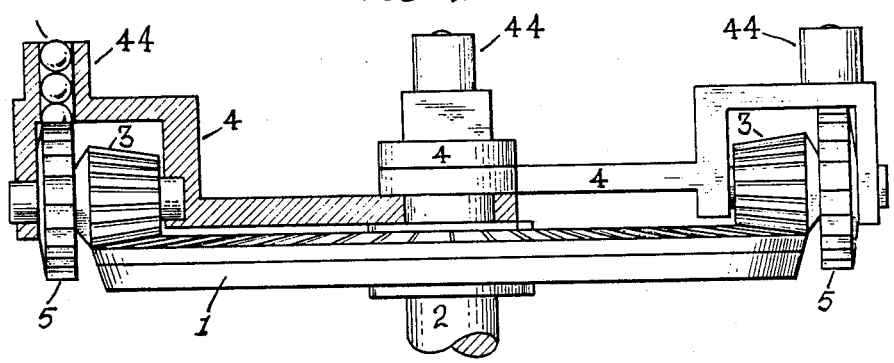
FIG. 2 is a side view of the output section.

The output section (FIG. 1 and FIG. 2) is composed of a bevel gear 1, an output shaft 2 and three pinions 3. Each pinion is joined to the gear's axle 2 by an independent arm 4 so each pinion can turn freely at dissimilar speeds from the other. A sprocket 5 is fixed to the axle of each pinion 3.

THE INPUT SECTION

The driving part (FIG. 3) has the shape of an equilateral triangular plate 6, with three slots 7 spaced radially at intervals. The 66 represents the full shape of the driving plate. A cam 8 covers exactly 120° of the cam plate 9 which is centralized on the input shaft 10 (shaded surfaces in 9, FIG. 4 and FIG. 5).

THE DEVICE'S OPERATION

Figures 3, 3A:
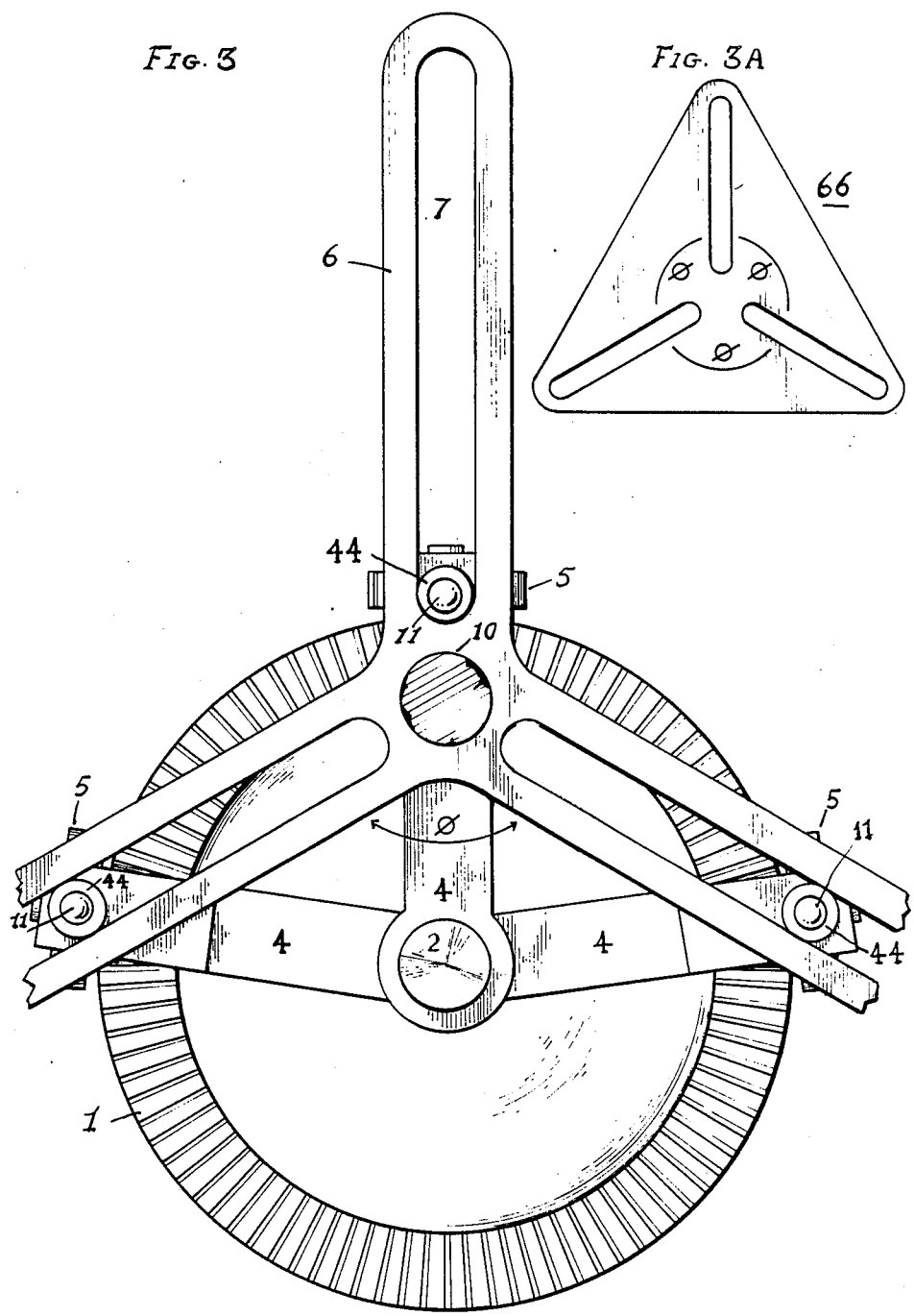
FIG. 3 is a top view of the input plate driving position on the output section.
FIG. 3A is a reduced side view of the driving plate.
Figure 6:
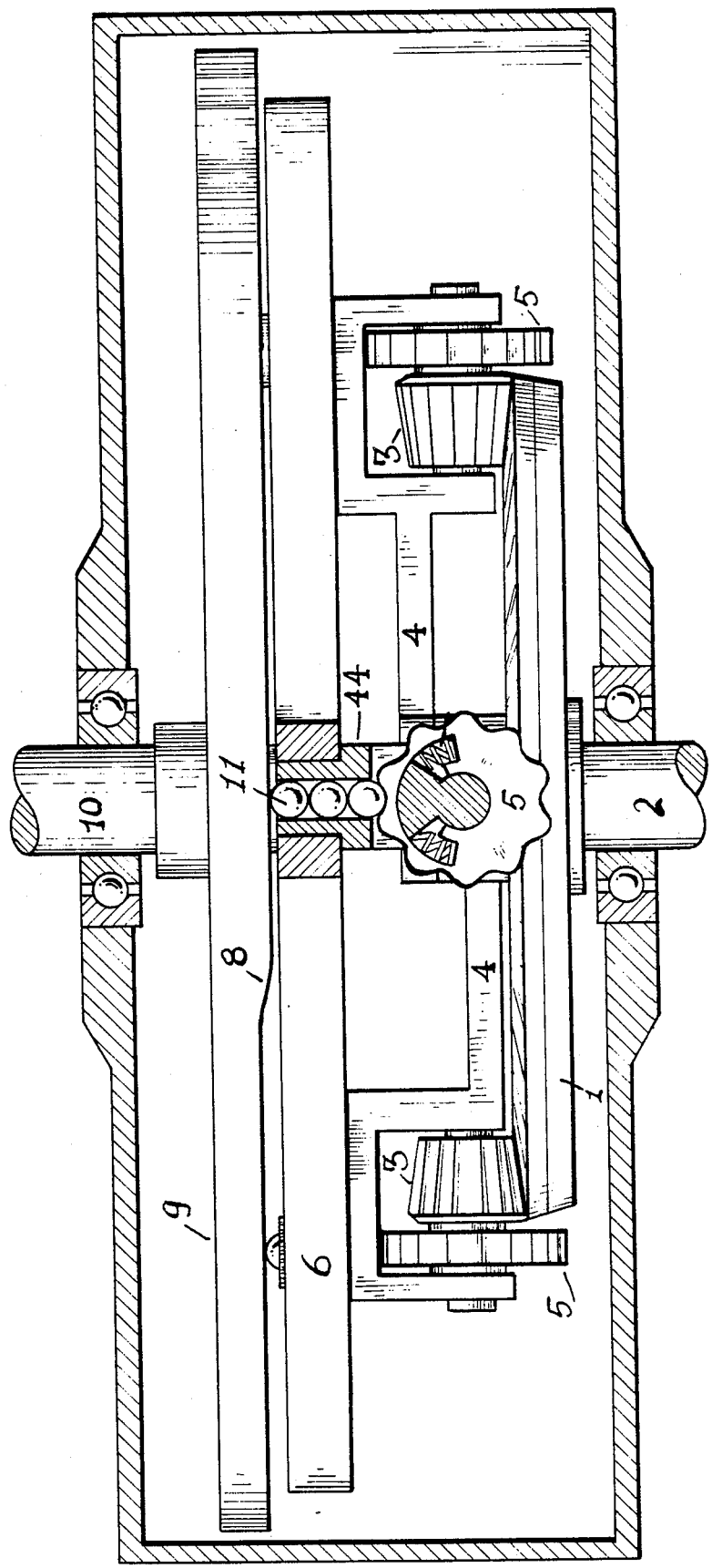
FIG. 6 is a side view of the complete construction of the device at work.

The basic mechanism of this device is the eccentricity between the input and the output sections (FIG. 3). The input plate is mounted eccentricly on the output gear 1 and each of the three slots 7 of the driving plate 6, takes charge of a pinion 3 and turn it around the output gear. The eccentricity between the input and the output section makes each pinion turn at a different speed from the others. When a pinion overlaps the cam 8 this cam 8 pushes down the balls 11 between the groves of the sprocket, blocks up the pinion on the output gear to make the input plate drive the output section by "pushing" the head 44 of the pinion's arm (FIG. 6). Basically, the cam zone is the length of the arc which is determined by the intersection of the periphery of the output gear 1 and the projection of the cam 9 onto the plane of the output gear 1. This length of the arc is the area through which the balls 11 are forced down into an indentation machined in the periphery of item 5 which gives it the shape of a sprocket. It is through this length of the arc that pinion 3 is fixed in and does not rotate about its center yet still undergoes a linear displacement along the out ring 1 to which it meshes. This results in driving of the input plate which, in turn, drives the output gear 1 through item 5. In short, the cam zone is the length of the arc through which the transmission of work is achieved. Because the cam's angle is 120°, same as the distance between the pinions, it is obvious that the cam is effective only on one pinion at a time, while the other pinions turn freely without any effect on the output gear. So the cam works, alternately, on one pinion then on the other. The variability of the transmission is accomplished by simply varying the length of the arc (or cam zone) thus resulting in a corresponding change in the output speed. Item 5 (FIG. 6) shows the way the sprocket is mounted. It is in twisting position around the pinion's axle to give the balls 11, in the entry of the cam, an immediate access to the grove in the sprocket. Item 5 does share the same shape as a sprocket. However, item 5 and a sprocket do not have the same function. In the present invention, items 5 are merely wheels with indentations or concavitities machined around their peripheries and are designed to engage balls 11 in order to halt item 5's rotational displacement around their respective centers.

The springs 26 shown inside item 5 serve dual purposes. The essential purpose is to allow a limited displacement of item 5 independently of item 3 thus permitting the alignment of the indentations of items 5 and balls 11. The secondary purpose of the springs is to dampen the deceleration which item 3 undergoes as the unit comprising 3 and 5 enters the cam zone allowing for a smooth meshing of pinion 3 and output gear 1.

THE RATIO

Figure 5:
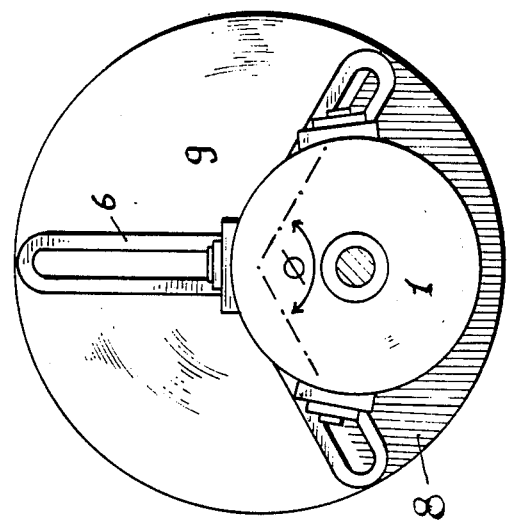
FIG. 5 is the bottom view of the transmission at its lowest ratio.
Figure 4:
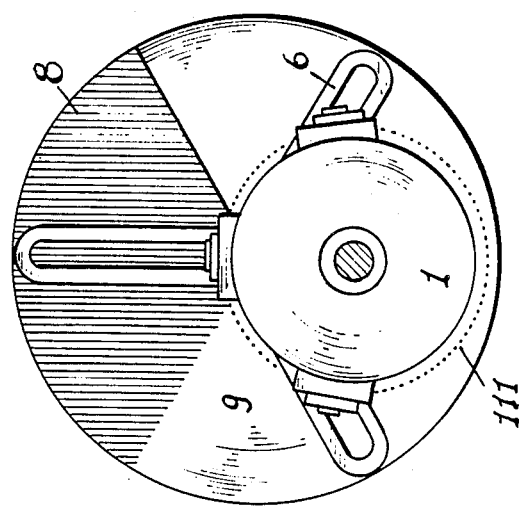
FIG. 4 is a bottom view of the transmission at its highest ratio.

In moving the cam 8 around the input axle 10 the ratio's range can change from the highest to the lowest (FIG. 4 and FIG. 5). In FIG. 4 (bottom view of the device) the cam 8, a constant 120°, covers only 40° of the output circumference (a slight circle 111, FIG. 4); it is the highest ratio: 3.00:1. In FIG. 5 the cam covers about 200° of the output circumference, the lowest ratio: 0.33:1. If in this design the ratio range from the equivalent of about 3.00:1–0.33:1, or under a numerical range of four numbers, it is evident that in increasing the eccentricity we increase the ratio's range, which is the ultimate key in any kind of transmission. With regard to the eccentricity of the input and output sections, from the drawings it is cleaar that the center of rotation of the input plate 6 is the shaft 10 and the center of rotation of the output gear 1 is the shaft 2. Therefore, the eccentricity is represented by the offset between shaft 10 and shaft 2. The number of pinions may be increased too. We may have four, six or more pinions, which require a change in the driving plate's design and in the cam's angle, to coordinate the number of pinions. The multiplication of the pinions' number will have the advantage to make the rotation of the output axle more even and smoother. Pinions 3 undergo two basic types of displacement: a linear displacement along the periphery of the output gear 1; and an angular or rotational displacement around their respective centers. The pinion 3 transmits work from input 6 to output 1 only when located in the cam zone. That is, when the balls 11 are lodged into an indentation in item 5. Hence, the angular velocity of item 3 is zero. The relevant variation in the present transmission is the length of the arc defined by came zone.

The function of the bevel gear and the pinions in this device is different from the function of the conventional gears. Here the pinion's task is not to drive the gear but to clutch it when engaged. Driving is performed by the driving plate's slots which "push" the head 44 of the pinion's arm 4. That explains the absence of the common friction and slide in this device, which are the disadvantages in conventional gearing.

We claim:

1. An infinitely variable speed transmission comprising:

an input shaft;

a drive plate having a plurality of radial slots therein, said drive plate fixed to said input shaft;

an output shaft parallel to said input shaft;

a bevel gear fixed to said output shaft;

a plurality of independently rotatable sprocketed pinions freely rotatable about and meshing with said bevel gear, said pinions also engaging said drive plate by projections from said pinions slidably mounted in said radial slots in the drive plate; and clutching means for selectively locking and unlocking said pinions in sequence to effect driving of said bevel gear.

* * * * *